P. WEBER.
PHONOGRAPH.
APPLICATION FILED AUG. 6, 1910.
1,220,480.
Patented Mar. 27, 1917.
8 SHEETS—SHEET 1.
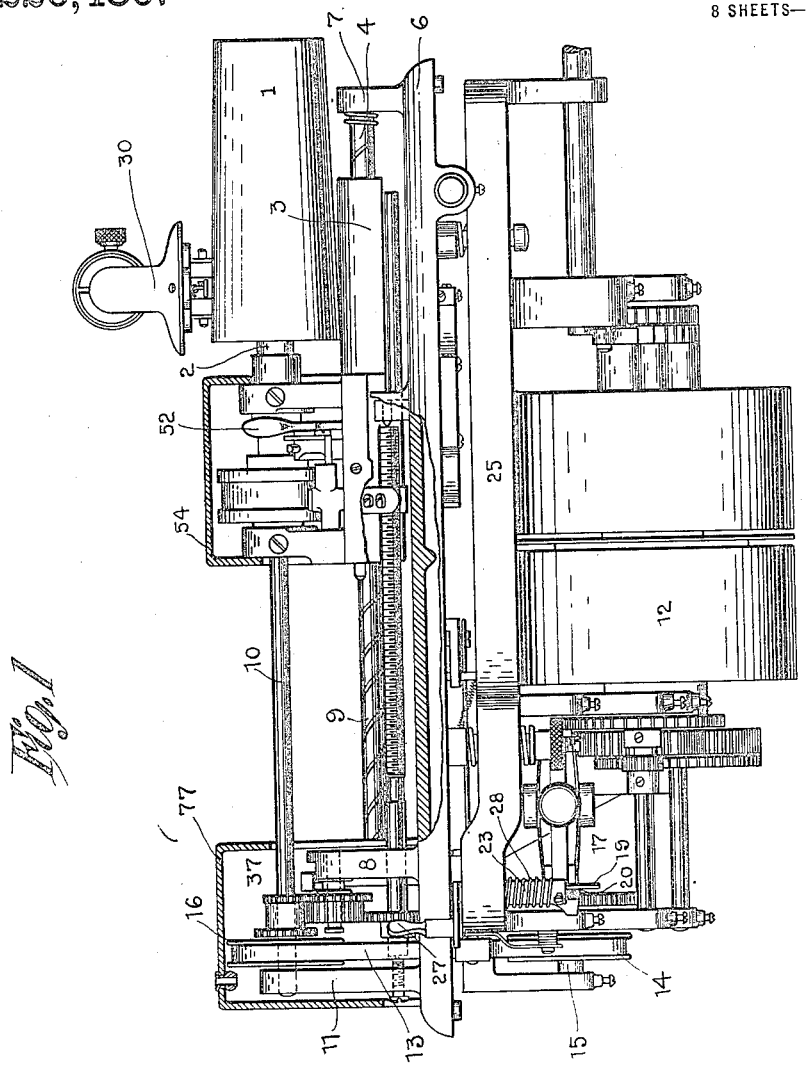

P. WEBER.
PHONOGRAPH.
APPLICATION FILED AUG. 6, 1910.
1,220,480.
Patented Mar. 27, 1917.
8 SHEETS—SHEET 2.
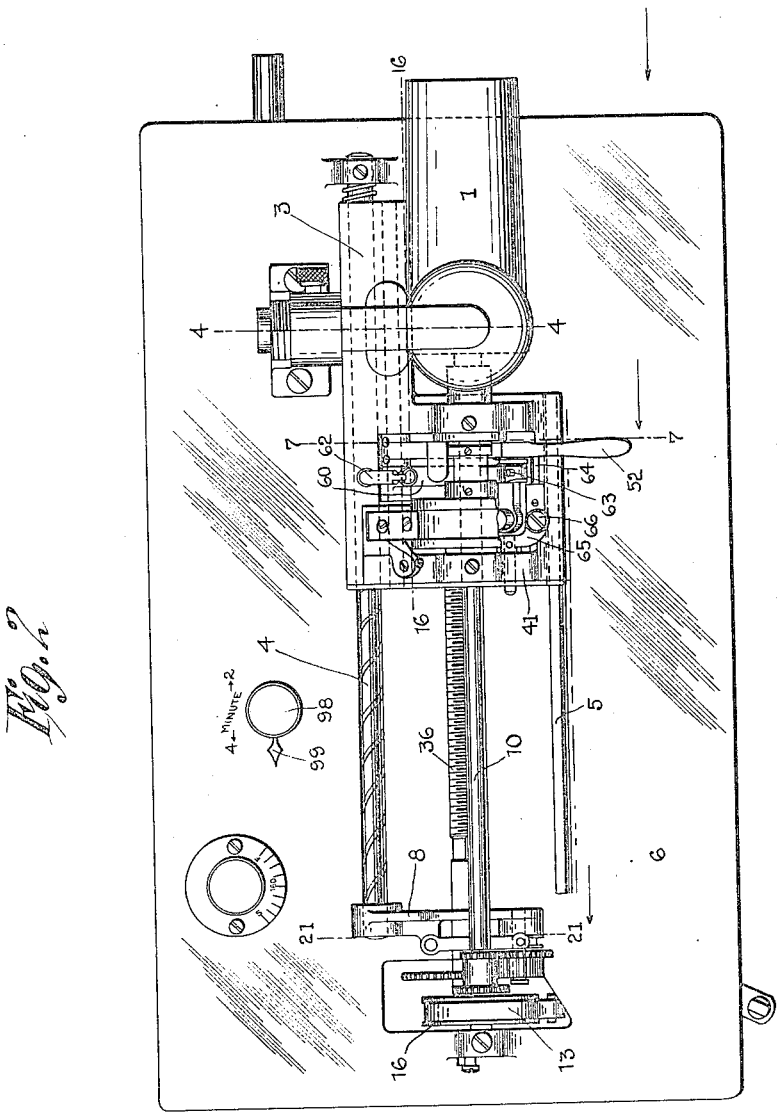

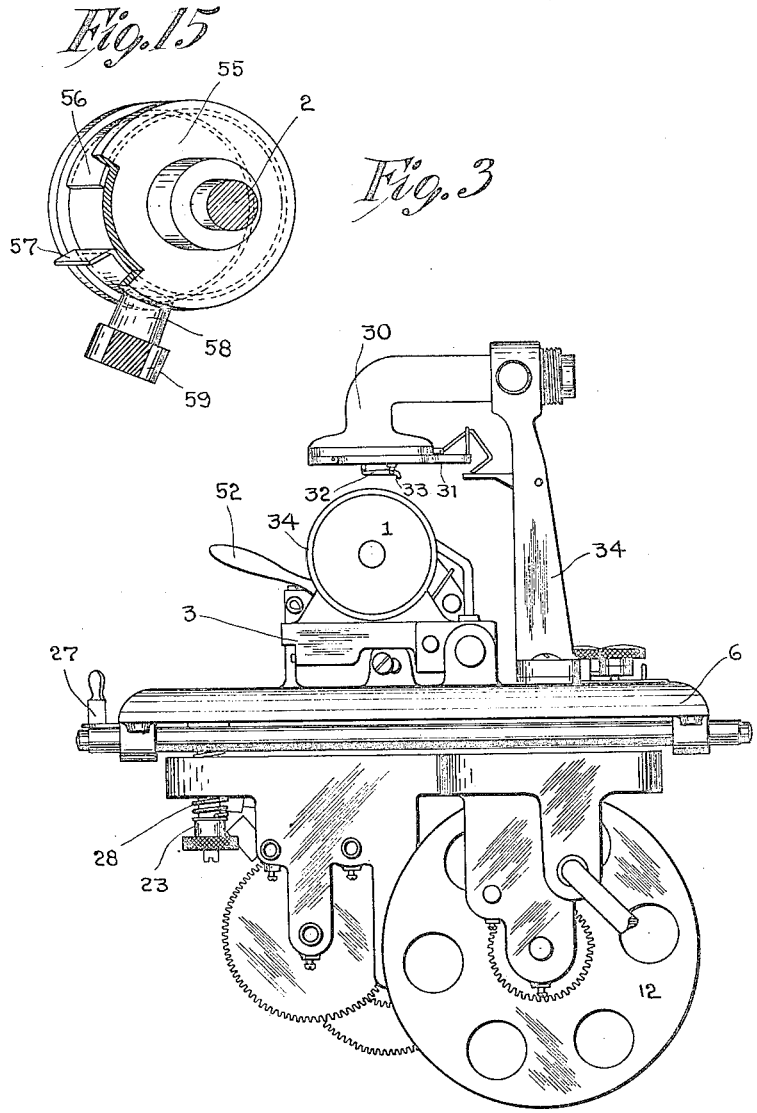

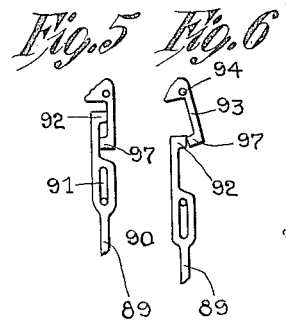
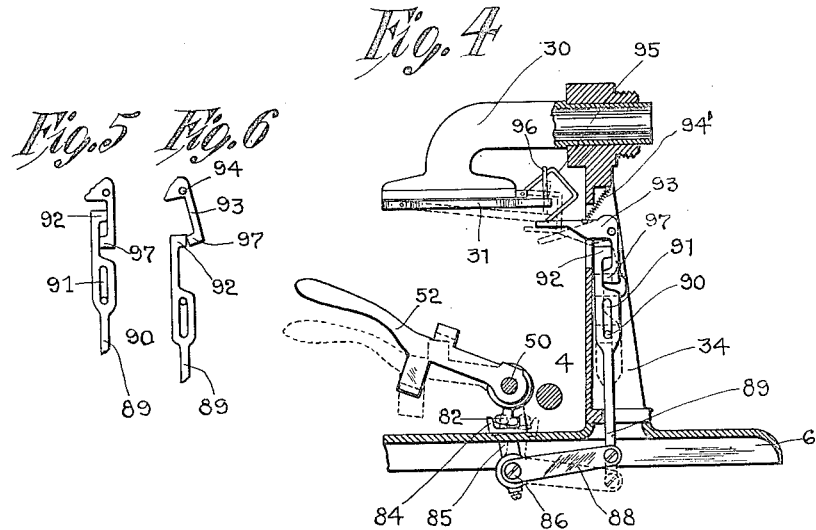
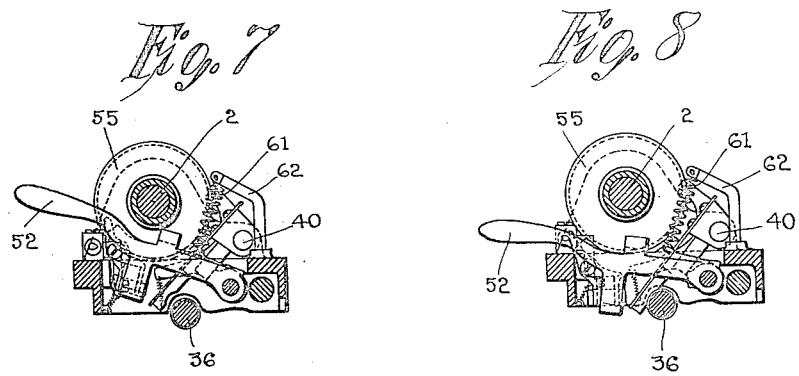

P. WEBER.
PHONOGRAPH.
APPLICATION FILED AUG. 6, 1910.
1,220,480.
Patented Mar. 27, 1917.
8 SHEETS—SHEET 5.
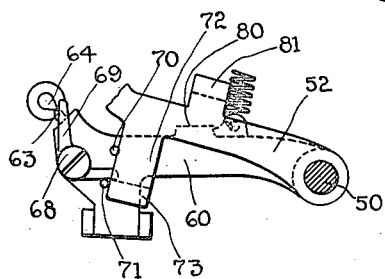
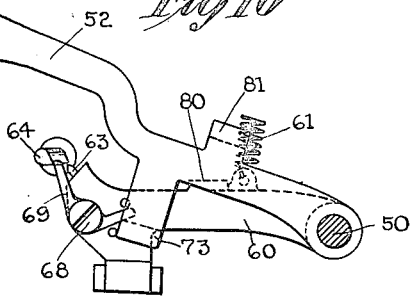
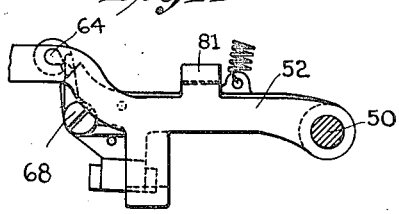
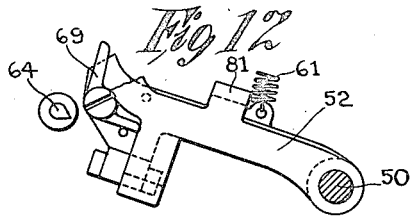
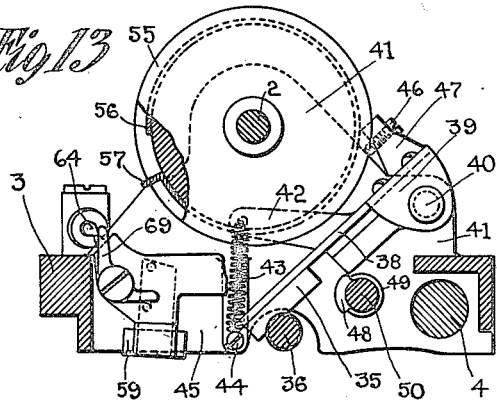
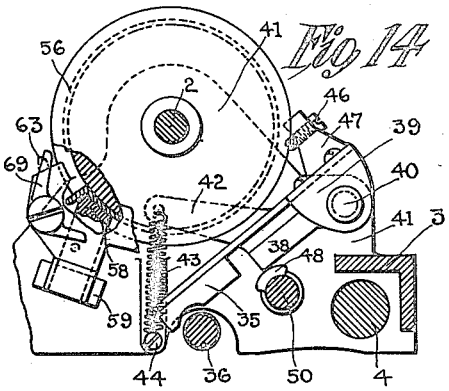

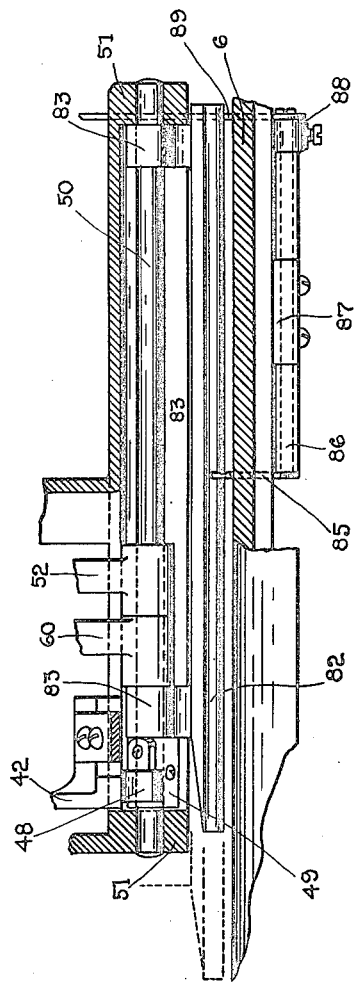

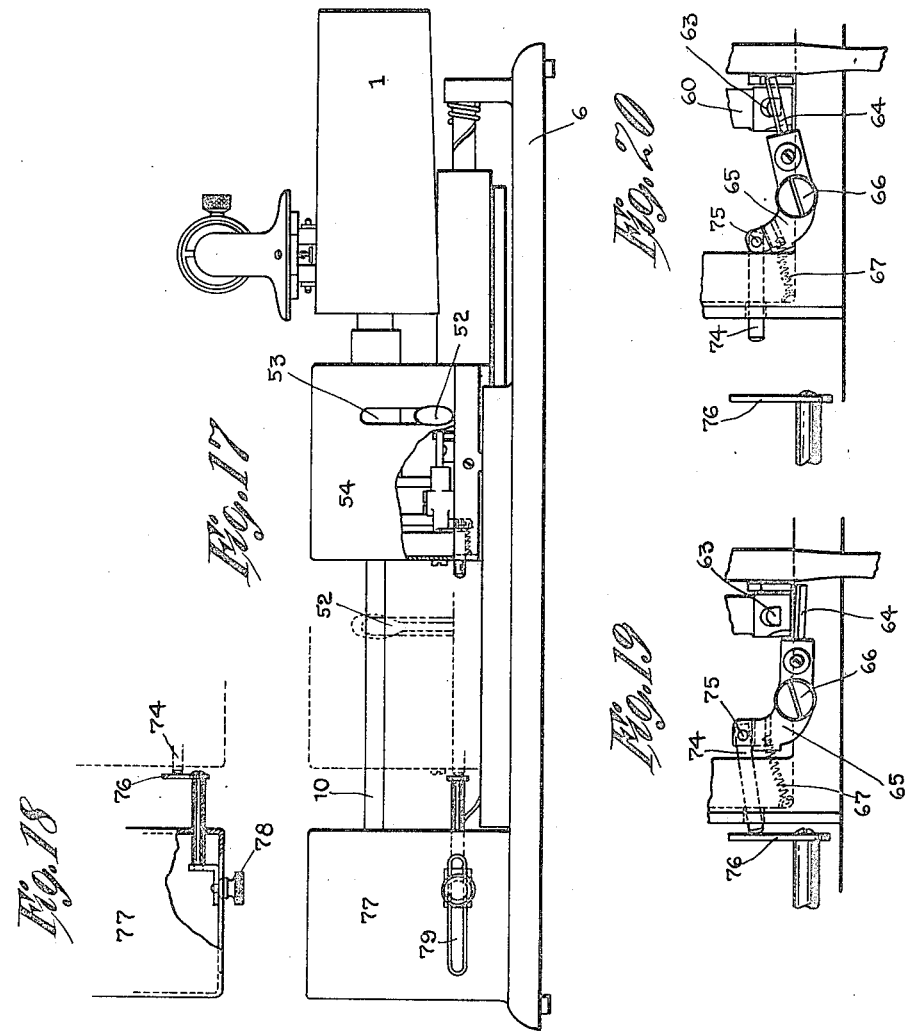

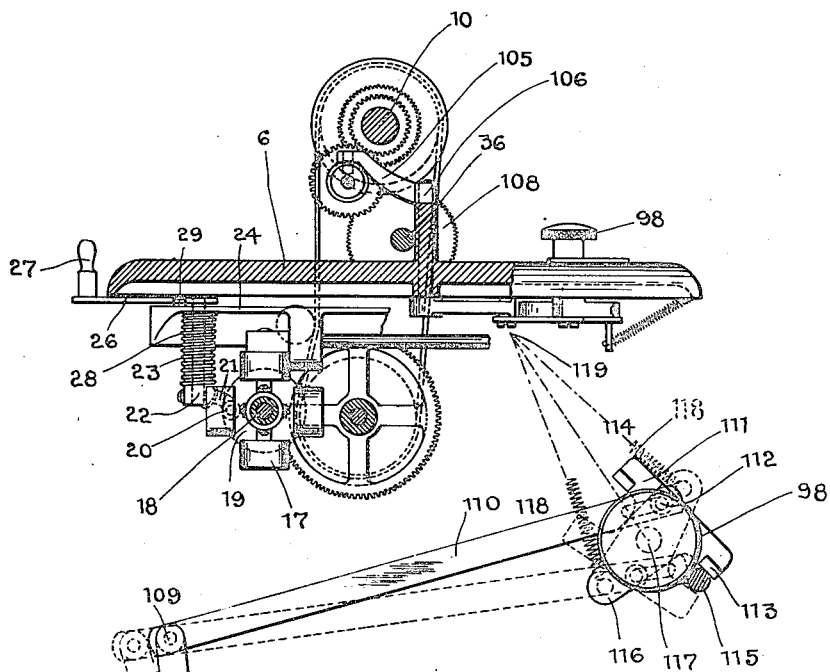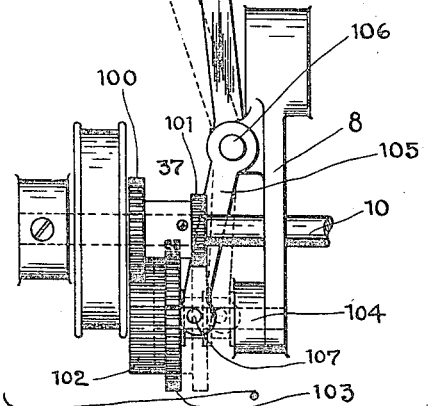

UNITED STATES PATENT OFFICE.

PETER WEBER, OF ORANGE, NEW JERSEY, ASSIGNOR TO NEW JERSEY PATENT COMPANY, OF WEST ORANGE, NEW JERSEY, A CORPORATION OF NEW JERSEY.

PHONOGRAPH.

1,220,480.   Specification of Letters Patent.   Patented Mar. 27, 1917.

Application filed August 6, 1910. Serial No. 575,861.

*To all whom it may concern:*

Be it known that I, PETER WEBER, a citizen of the United States, and a resident of Orange, in the county of Essex and State of New Jersey, have invented certain new and useful Improvements in Phonographs, of which the following is a description.

My invention relates to phonographs, and particularly to phonographs of the type in which the relative feed between the reproducing stylus and the record is obtained by the shifting of the record mandrel axially past the reproducer which is stationary, although my invention is not limited as to all its features to a phonograph having an axially movable mandrel. Among the objects of my invention are the provision of improved starting and stopping means, both manual and automatic, means for raising the floating weight of the reproducer to withdraw the reproducing stylus out of operative position when the machine is stopped, and for at the same time withdrawing the feed nut from the feed screw, and also improved means for changing the rate of feed of the phonograph, so that the same may be adapted to operate upon different kinds of records, as, for example, the so-called 2-minute and 4-minute records. My invention comprises the starting and stopping of the rotating mandrel by a lever or other simple manipulative means, which, at the same time controls the adjustment of the stylus into or out of operative position, and also the engagement or non-engagement of the feed nut with the feed screw, this starting and stopping lever being preferably mounted upon the traveling carriage of a movable mandrel phonograph, which is also provided with an automatic stopping means adapted to be operated to stop the rotation of the record, stop the feed, and place the stylus in inoperative position at a predetermined point in the travel of the carriage, as at the end of the record. Other objects of my invention will appear in the following specification and appended claims.

In order that a clearer understanding of my invention may be had, attention is hereby directed to the accompanying drawings, forming part of this specification, and disclosing one embodiment of my invention. The same reference characters will be used throughout the figures to denote corresponding parts. In the drawings, Figure 1 represents a side elevation, partly in section, of a phonograph embodying my invention. Fig. 2 represents a plan view of the same. Fig. 3 represents an end view looking in the direction of the arrow in Fig. 2. Fig. 4 is a cross section on line 4—4 of Fig. 2, some of the parts being shown in side elevation. Figs. 5 and 6 are details of the mechanism shown in Fig. 4 for raising and lowering the floating weight, the mechanism being in such a position in Fig. 5 that the weight may be lifted, and the lifting device in retracted position being shown in Fig. 6. Figs. 7 and 8 are cross sections taken on line 7—7 of Fig. 2, Fig. 7 representing the mechanism when the machine is stopped, and Fig. 8 showing the mechanism when in running position. Figs. 9, 10, 11 and 12 are enlarged detail views of the starting and stopping lever and coöperating parts illustrated in Figs. 7 and 8, the mechanism being shown in Fig. 12 in stopped position, in Fig. 11 in running position, and in Figs. 9 and 10 the latched stopping lever is being tripped to stop the mechanism. Figs. 13 and 14 are enlarged views similar to Figs. 7 and 8, the manually-operated lever shown in Figs. 9 to 12 being omitted for clearness. Fig. 15 is an isometric view partly in section of the stopping drum carried by the mandrel shaft shown in Figs. 13 and 14 with the coacting projection carried by the stopping lever. Fig. 16 is a partial vertical section taken on line 16—16 in Fig. 2. Fig. 17 is a side elevation of the phonograph with the casings inclosing the change gears and the starting and stopping mechanisms in place showing the operation of the automatic stopping device. Fig. 18 is a partial plan showing the adjustment of the stop contacted by the starting and stopping device. Figs. 19 and 20 are partial plan views of the automatic stopping device carried by the traveling carriage, the carriage approaching the end of its travel in Fig. 20 with the stopping lever held in latched position, the automatic stopping device having contacted the stopping lug in Fig. 19 and the latch being tripped. Fig. 21 is a partial section taken on line 21—21 of Fig. 2, and Fig. 22 is a plan view made on a larger scale of the change gear mechanism shown in Fig. 21, part of the mechanism shown being located beneath and part above the bed plate of the phonograph which is not illustrated in this figure for clearness.

Referring to the drawings, the mandrel 1 adapted to support a cylindrical sound record is rigidly mounted on hollow shaft 2 carried by traveling carriage 3 which is adapted to travel back and forth upon rod 4 and slideway 5 projecting upwardly from the top of bed plate 6 of the phonograph. Guide rod 4 is carried in brackets 7 and 8 rising from bed plate 6 and is preferably provided with a spiral channel 9 for holding oil for lubricating the sliding bearing of the traveling carriage upon the same. Mandrel 1 and shaft 2 are rotated by means of shaft 10 which is rotatably mounted, one end of the same shown to the left in Fig. 1 being supported by bracket 11 rising from bed plate 6 of the phonograph, the other end of shaft 10 being supported within the hollow shaft 2 of mandrel 1. The right-hand end of shaft 10, referring to Fig. 1, is provided with a key which is adapted to be located within a keyway on the inner surface of hollow shaft 2, so that rotation may be imparted to shaft 2 from shaft 10, while at the same time, shaft 2 may be moved lengthwise along shaft 10 during the travel of carriage 3. Rotation is imparted to shaft 10 from spring motor 12 through belt 13 which runs over belt wheel 14 on shaft 15 and belt wheel 16 mounted on shaft 10. The motor 12 is governed by the usual centrifugal governor 17.

The governor shaft 18 is provided with the usual friction disk 19 with which coacts the friction pad 20 carried by arm 21 to stop and start the motor in the usual manner. The manner of moving the friction pad into and out of contact with the friction disk is, however, a feature of my invention. Arm 21 is integral with vertical rod 22 which extends through a sleeve 23 secured to or integral with the lower side of the horizontal portion 24 of the motor-carrying frame 25, as shown in Figs. 1 and 21. On the upper end of rod 22 is secured above horizontal frame member 24 the arm 26 having integral therewith or secured thereto a handle 27. A spiral spring 28 encircles sleeve 23, the upper end of the spring being secured to the under side of frame member 24, and the lower end of the spring being wrapped about and secured to arm 21 carrying pad 20 in such a manner that the tendency of spring 28 is always to force pad 20 into contact with disk 19. A small lug or pin 29 rises from the upper surface of frame member 24 to form a stop or abutment to hold arm 26 in such position that pad 20 is out of contact with disk 19 and the motor is free to run. When it is desired to stop the motor, arm 26 is oscillated by means of handle 27 in the direction to bring pad 20 into contact with disk 19, arm 26 rising above stop 29 as it contacts the same, a sufficient amount of vertical play being permitted rod 22 in sleeve 23, spring 28 tending to depress rod 22 and arm 21 into their lower position. When arm 26 is passed over stop 29, spring 28 forces pad 20 into contact with disk 19. When the motor is to be allowed to run, handle 27 is pressed in the opposite direction until it passes over stop 29, when spring 28 lowers rod 22 to latch arm 26 back of stop 29 to hold pad 20 out of contact with disk 19.

The reproducer sound box 30 which is provided with floating weight 31 carrying stylus lever 32 and stylus 33 is supported rigidly by vertical bracket 34 rising from and secured to bed plate 6 of the phonograph. Bracket 34 is hollow and contains mechanism for lifting floating weight 31 to move stylus 33 out of operative position, as will be described. When stylus 33 is operatively positioned it is adapted to coact with a phonograph record carried by mandrel 1, the mandrel and record being rotated through shaft 10 as has been described, and the relative feed between the record and the stylus being secured by the longitudinal movement in a straight line of the mandrel 1 carried by traveling carriage 3. This travel is imparted to carriage 3 by any suitable means, such as the coaction of the usual half nut 35 carried by carriage 3 with the feed screw 36 which is supported in brackets rising from bed plate 6. Screw 36 is rotated from shaft 10 by means of gearing 37, as shown in Figs. 1 and 22, at either of two desired speeds, as will hereinafter be described. Feed nut 35 is carried by arm 38 secured to a member 39 pivotally mounted upon a stud 40 carried by bracket 41 rising from one end of traveling carriage 3, as shown in Figs. 2 and 13. Member 39 to which arm 38 carrying feed nut 35 is secured has formed integral therewith an arm 42 to which is secured a spiral spring 43, the other end of which is attached at 44 to the end member 45 of traveling carriage 3, spring 43 tending to move member 39 about its pivot 40 to move nut 35 into contact with feed screw 36. The engaging position of the feed nut with the feed screw may be adjusted by means of a suitable screw 46 mounted in arm 47 secured to or integral with member 39 pivoted on stud 40, the end of stop screw 46 engaging the side surface of bracket 41 to limit the movement of the nut into engagement with the feed screw, as shown in Figs. 13 and 14, the nut being shown in engagement in Fig. 13, and out of engagement in Fig. 14.

The nut is moved out of engagement with the feed screw against the elastic force of spring 43 by means of a cam surface 48 upon a sleeve 49 secured to a horizontal shaft 50, which is rotatably mounted in depending flanges 51 at the lower part of traveling carriage 3, as shown in Fig. 16. Cam 48 upon the oscillation of shaft 50 contacts the lower surface of arm 42 secured to member 39 pivoted on stud 40 to raise nut 35 out of contact with screw 36, thereby tensioning spring 43.

Rock shaft 50 may be oscillated to move the feed nut into and out of engagement with the feed screw by means of hand lever 52 secured to rock shaft 50 and having its handle extending downwardly through a slot 53 in the casing 54 which covers the mechanism being described upon carriage 3 as shown in Fig. 17. The oscillation of rock shaft 50 is adapted not only to move the feed nut into or out of engagement with the feed screw, but at the same time to operate the starting and stopping lever to permit the rotation of the mandrel 1 or to prevent the same, and also to operatively position the stylus 33 or to move the same into inoperative position. These means will now be described.

Mandrel shaft 2 carries a flanged disk or drum 55 which carries a band 56 encircling the major portion of the disk or drum between the flanges of the same, said band 56 preferably being provided with outwardly extending lug 57. A pin 58 carried by a horizontally extending portion 59 of an arm 60 loosely mounted upon rock shaft 50 is adapted to be brought into the path of lug 57 upon band 56 to stop the rotation of shaft 2 and mandrel 1 whenever it is desired to stop the phonograph, at the same time that the feed nut is moved out of engagement with the feed screw, so that the traveling carriage 3 can be returned to its starting point. Pivoted arm 60 is given a constant tendency to cause pin 59 to contact brake band 56 and place the same in the path of lug 57 by spiral spring 61 secured to the upper side of pivoted arm 60 and at its other end secured to an arm 62 carried by traveling carriage 3 as shown in Figs. 2, 7 and 8. Arm 60 carries at its upper end a knife-edged pin 63 adapted to coact with pin 64 which is horizontally disposed and secured to bell crank 65 pivoted at 66 to traveling carriage 3, as illustrated in Figs. 2, 19 and 20, the engagement of pin 63 with pin 64 serving to latch arm 60 in its lower position with pin 58 out of the path of lug 57, so that the mandrel is free to rotate. Bell crank 65 is held in position to cause pin 64 to engage over pin 63 carried by arm 60 when arm 60 is depressed by means of spiral spring 67 attached to bell crank 65 and to the end member of traveling carriage 3. When bell crank 65 is oscillated to the right, as shown in Figs. 19 and 20, the latch will be tripped, pin 63 released from pin 64, and arm 60 moved forwardly by spring 61 to cause pin 58 to engage the band 56 upon drum 55 to stop the mandrel when lug 57 on band 56 contacts pin 58 in the revolution of the drum.

Bell crank 65 may be oscillated to trip the latch and release arm 60 either by means of hand lever 52 at any time or automatically when the carriage reaches a predetermined point in its travel at the end of the record. Arm 60 carries pivoted thereto at 68 a bell crank trigger 69. Pins 70 and 71 mounted on arm 60 coact with the lower arm of bell crank 69 to limit the movement thereof in either direction. Lever 52 has extending downwardly therefrom an arm 72 carrying a lateral lug 73 which, upon the upward movement of lever 52 is adapted to strike the lower part of bell crank 69 and cause the same to oscillate to the left, referring to Figs. 9 to 12 inclusive. As trigger 69 is moved to the left, the end of its upper arm contacts pin 64 and moves the same to the left, as shown in Fig. 9, pin 63 being released from pin 64 and arm 60 moving upwardly to stop the rotation of the mandrel. The relative positions of levers 52 and 60, trigger 69, and pin 64, when the pin 58 is in contact with stop lug 57 and the mandrel is stopped, are shown in Fig. 12. In Fig. 11 the parts are shown in latched position, the phonograph running, and in Figs. 9 and 10 the latch is just being tripped to stop the machine.

The latch may be tripped to release arm 60 automatically by the engagement of the pin 74 pivotally connected at 75 to bell crank 65 with an adjustable stop 76 carried by the casing 77 surrounding the change gears 37 as shown in Figs. 17 to 20 inclusive. The pin 74 extends through an opening in the end member of traveling carriage 3 as shown, and adjustable stop 76 extends through an opening in casing 77, the position of stop 76 being adjusted by means of thumb screw 78 which is adapted to clamp stop 76 at any desired position along the slot 79 in casing 77. In Fig. 20, the traveling carriage is shown approaching the adjustable stop 76 with arm 60 in latched position. In Fig. 19, pin 74 has contacted stop 76 and bell crank 65 has been moved to the right to release the arm 60 and permit the phonograph to be stopped. In practice, when one plays a record which has been placed on mandrel 1, the traveling carriage is moved to the left to position the stylus opposite the end of the record, when stop 76 may be adjusted into position to engage pin 74, so that when the record is played, the machine will automatically stop exactly at the end of the record.

When arm 60 is released manually through the movement of hand lever 52 to stop the machine, lever 52 moves a sufficient distance before lug 73 contacts the lower member of trigger 69 to cam the feed nut 35 out of engagement with feed screw 36, since lever 52 is secured to rock shaft 50, to which also is secured cam lug 48 which lifts arm 38 carrying the feed nut upon the oscillation of rock shaft 50. When, however, the latch is tripped automatically through the engagement of pin 74 with stop 76, the necessary movement of rock shaft 50 is obtained by the engagement of surface 80 upon the upper side of lever 60 with the under side of a lateral projection 81 on hand lever 52, so that hand lever 52 will be carried up with arm 60 as the latter is moved to stopping position by spring 61, and shaft 50 will be rocked as before to move the feed nut out of engagement with the screw. When the machine is to be started, lever 52 is depressed, lug 81 thereon forcing arm 60 downwardly until pin 63 moves under pin 64 to latch arm 60 in lowered position with the feed nut engaging the feed screw and the mandrel in rotation.

Band 56 encircling the drum 55 is preferably not positively secured to the same, but engages the drum closely by friction, thus relieving shock when pin 58 contacts lug 57 on the band 56. It is obvious that in place of forming band 56 with the lug 57 and thus stopping the phonograph by positive contact, lug 57 might be omitted and band 56 made continuous, and the machine stopped by the braking action of pin 58 upon the band 56.

As stated, the floating weight 31 of reproducer 30 is adapted to be positioned by the oscillation of rock shaft 50 at the same time that the feed and rotation of the mandrel are adjusted. Rock shaft 50 has pivotally secured thereto a rod 82 of approximately the same length as rock shaft 50, rod 82 being pivotally connected to rock shaft 50 adjacent its two ends by means of arms 83, as shown particularly in Fig. 16. As the traveling carriage travels along its path, rod 82 carried by the carriage slides between the arms 84 of a forked lever 85 pivoted on rod 86 mounted below the bed plate 6 of the phonograph, the forked arms 84 of lever 85 extending through a slot in the bed plate. Rod 86 is secured to bed plate 6 by means of bracket 87. A lever 88 is secured upon the end of rod 86 opposite to bell crank 65, referring to Figs. 4 and 16, and the vertical link 89 is pivotally connected to the opposite end of lever 88, and extends upwardly within the hollow stationary reproducer supporting arm 34, being guided by pin 90 engaging within slot 91 of link 89. It is obvious that the oscillation of shaft 50 causes the vertical reciprocation of link 89 by the enagement of rod 82 with one arm or the other 84 of lever 85. The upper end of link 89 is formed with a cam lug 92. A trigger or bell crank 93 is pivoted at 94 to bracket 34, above the top of link 89, spring 94' attached to bell crank 93 and to the bracket 34 tending constantly to move bell crank 93 to the right, referring to Fig. 4. Floating weight 31 has pivotally secured thereto an inverted U-shaped member 95, the upward movement of which is limited by engagement with stirrup 96 carried by floating weight 31. The lower end of member 95 contacts the upper arm of bell crank 93, so that when the bell crank is moved to the right by spring 94', the upper arm of bell crank 93 lifts member 95 and floating weight 31 to move stylus 33 out of contact with the record carried by mandrel 1. This position of the parts is shown in full lines in Fig. 4, the opposite position in which the floating weight is lowered and the stylus is in engagement with the record, being shown in Fig. 4 in dotted lines. Trigger 93 has formed upon the lower end of the lower arm thereof a cam lug 97, which is adapted to coact with lug 92 upon the upper end of link 89. When the machine is stopped, hand lever 52 being in its upper position, lug 92 on link 89 is situated above lug 97 on trigger 93, the latter being moved into its raised position to elevate the floating weight. When rock shaft 50 is rocked to the left, however, referring to Fig. 4, as by the downward movement of hand lever 52, to permit the mandrel to rotate to cause the engagement of the feed nut with the feed screw, link 89 is moved downwardly, lug 92 on the link camming lug 97 on the bell crank 93 to the right to permit the stylus to descend into engagement with the record. The positions of the link and the bell crank when the machine is running are shown in Fig. 6, and the positions of the same parts when the machine is stopped, in Fig. 5.

As has been stated, the feed screw 36 is rotated from shaft 10 by means of gearing 37, when it is desired to operate upon two kinds of records upon the same machine, as the so-called 2-minute and 4-minute records, means for changing the rate of rotation of feed screw 36 should be provided. I have shown such feed changing means in Figs. 2, 21 and 22, and in Fig. 22 particularly. As there illustrated, the hand knob 98 extends vertically through bed plate 6 and is provided with a pointer 99 adapted to coact with suitable indicia upon the bed plate as the words "4-minute" and "2-minute" to indicate the position of the gears for playing either 2-minute or 4-minute records. As shown, shaft 10 is provided with fixed gears 100 and 101, gears 102 and 103 being mounted upon a stud 104 which is slidably mounted in bracket 8 rising from bed plate 6. Gears 102 and 103 are adapted to be shifted to the right or left, referring to Fig. 22, by means of shifting lever 105 pivoted at 106 and carrying pin 107 engaging between shoulders secured to gears 102 and 103 for shifting the same. Gear 103 is a narrow gear, and gear 102 is a broad gear, which in both positions engages with gear 108 secured to the shaft of feed screw 36. When the change gears are moved to the right, gear 103 engages gear 101 and shaft 36 is driven from shaft 10 through gears 101, 103, 102 and 108. When the change gears are moved to the left, however, gear 103 is moved out of contact with gear 101 and gear 102 moved into contact with gear 100, the feed screw then being driven through gears 100, 102 and 108 at a different speed from that imparted to the feed screw by the first combination. Vertical pin 106 upon which is pivoted shifting lever 105 is mounted in an offset of bracket 8 and extends downwardly through bed plate 6, the lower end of pivot pin 106 having pivoted thereto at 109 link 110. Knob 98 extends downwardly through bed plate 6 and has secured to it beneath the bed plate the member 111. Link 110 is connected to member 111 by means of the pin and slot connection 112. Member 111 has formed thereon surfaces 113 and 114 which are adapted to contact stop pin 115 extending downwardly from the bottom of bed plate 6 to position member 111 and the change gears 102 and 103 in proper position for operating upon either the 2-minute or the 4-minute record. Member 111 has an arm 116 extending therefrom on the opposite side of pivot 117 of member 111 from the stop lugs 113 and 114, and a spiral spring 118 is attached to the end of arm 116, the other end of spring 118 being secured to bed plate 6 as indicated at the point 119 in Fig. 22. The positions of link 110, member 111 and spring 118 when gear 102 is in engagement with gear 100 are shown in full lines in Fig. 22, the corresponding positions being shown in dotted lines for the opposite position in which gear 103 engages gear 101. When the knob 98 is turned to move member 111 from the full line to the dotted line position, it will be noted that spring 118 is stretched as it moves to the right, referring to Fig. 22, until it has passed across pivot 117 of member 111. After this point, the tendency of the spring is to continue the rotation of the member 111 in the same direction, it only being necessary to move knob 98 slightly more than half way from one position to the other, the force of spring 118 completing the movement. Similarly, when the knob is moved in the opposite direction and member 111 returned from the dotted line to the full line position, spring 118 is extended until it has crossed center 117 when it acts to complete the movement and return member 111 to its full line position.

While I have described particular mechanism for the sake of clearness, it is obvious that my invention is not limited to the particular details of construction described, but that various modifications and equivalents may be employed within my invention and within the scope of the appended claims.

Having now described my invention, what I claim and desire to protect by Letters Patent is as follows:—

1. In a phonograph, in combination, a rotatable record support, a reproducer, means for producing a relative feeding movement along a substantially straight line between said reproducer and record support, said means comprising coacting members movable into and out of operative engagement with each other, means for rotating said record support, means for holding the same against rotation, means for latching said last named means in inoperative position, a single controlling member, and connections from said controlling member operable thereby at any desired point in the relative feeding movement between said reproducer and said record support to render said latching means operative or inoperative and to simultaneously cause said coacting members to be respectively engaged with or disengaged from each other, substantially as described.

2. In a phonograph, in combination, a rotatable record support, a reproducer provided with a stylus, said record support being movable with respect to said reproducer in a direction longitudinally of the record support, means for rotating said record support, frictional braking means for holding the same against rotation, a single controlling member, and means controllable by said member at any desired position of said record support relatively to said reproducer to render said braking means inoperative or operative and simultaneously therewith to cause said stylus to be moved respectively into or out of engagement with the surface of a record carried by said record support, substantially as described.

3. In a phonograph, in combination, a rotatable record support, means for rotating the same, a brake band frictionally engaged upon said support and having a lug formed thereon, a stylus adapted to be operatively positioned with respect to a record carried by said support, a member adapted to move into the path of said lug to stop said support, a member adapted to disengage said stylus from said support, and a single controlling member to cause said stopping and disengaging movements of said members, substantially as described.

4. In a phonograph, in combination, a rotatable record support, driving means therefor comprising a member having a cylindrical brake surface, and means for rendering said driving means inoperative, said second named means comprising a device movable with and yieldingly and non-positively connected to said cylindrical surface, and stopping means adapted to engage said device to stop said driving means, substantially as described.

5. In a phonograph, in combination, a rotatable record support, driving means therefor, a member rotatable with said driving means, a brake band encircling the major portion of said member and rotatable therewith, and means adapted to coöperate with said brake band to stop said driving means, substantially as described.

6. In a phonograph, in combination, a rotatable driving member, a record support mounted thereon, a stylus movable into and out of engagement with the surface of a record carried by said support, said driving member having a projection extending therefrom, a member adapted to be moved into the path of said projection to stop the rotation of said record support, means for disengaging said stylus from the record surface, and means comprising a single controlling member for moving said second named member into the path of said projection and for operating said stylus disengaging means, substantially as described.

7. In a phonograph, in combination, a rotatable record support, means for rotating the same, a reproducer provided with a floating weight and a stylus carried thereby, said record support having a lug connected therewith, a member adapted to move into the path of said lug to stop said support, a member adapted to lift said weight to disengage said stylus from the record, and a single controlling means movable to cause the said stopping and lifting movements of said members, substantially as described.

8. In a phonograph, in combination, a rotatable record support, driving means therefor, and means for rendering said driving means inoperative, said second named means comprising a substantially cylindrical brake band movable with said driving means and frictionally held against movement with respect to the same, and means movable into engagement with said brake band to stop said driving means, substantially as described.

9. In a phonograph, in combination, a rotatable record support, driving means therefor, a stylus movable into and out of engagement with the surface of a record carried by said support, braking means movable with said driving means and frictionally held against movement with respect to the same, means adapted to resist movement of said braking means to stop said driving means, means for disengaging said stylus from the record surface, and means for simultaneously causing the operation of said third and fourth named means, substantially as described.

10. In a phonograph, in combination, a rotatable record support, means for rotating the same, a reproducer provided with a stylus, a traveling carriage carrying said record support, means for progressing the same axially of the record support past the reproducer to produce a relative feed, and means for automatically stopping the rotation of the record support by frictional braking action, stopping the travel of the carriage, and lifting the stylus out of contact with the record at a predetermined point in the travel of the carriage, substantially as described.

11. In a phonograph, in combination, a traveling carriage, a rotatable record support carried thereby, means for rotating said record support, means comprising members movable into and out of engagement with each other for imparting a progressive travel to said carriage, and means for simultaneously stopping the rotation of said record support and moving said members out of engagement with each other at any desired point in the travel of said carriage, said last named means comprising a motion arresting device carried by said carriage, substantially as described.

12. In a phonograph, in combination, a traveling carriage, a rotatable record support carried thereby, means for rotating the same, means for imparting a progressive travel to said carriage, and means for stopping the rotation of said record support automatically or manually, said means comprising motion arresting mechanism carried by said carriage and including a member rotatable with said record support, substantially as described.

13. In a phonograph, in combination, a traveling carriage, a rotatable record support carried thereby, means for rotating the same, means for imparting a progressive travel to the same, and means for stopping the rotation of said record support and the travel of said carriage automatically or manually, said means comprising motion arresting mechanism carried by said carriage and including a member rotatable with said record support, substantially as described.

14. In a phonograph, in combination, a traveling carriage, a shaft carried thereby, a stationary frame, a rotative shaft carried thereby having an operative connection with said first shaft, a record support mounted on said first shaft, a brake member carried by said first shaft, a brake lever carried by said carriage adapted to coöperate with said member to stop the rotation of said record support, and means for operating said lever, substantially as described.

15. In a phonograph, in combination, a traveling carriage, a shaft carried thereby, a record support secured to said shaft, a lug rotatable with said shaft, a pivoted lever carried by said carriage carrying a projection and spring-impelled to move said projection into the path of said lug, a latch for holding said projection out of the path of said lug, and means for tripping said latch, substantially as described.

16. In a phonograph, in combination, a traveling carriage, a shaft carried thereby, a record support secured to said shaft, a band carrying a lug and connected to rotate with said shaft, a pivoted lever carried by said carriage carrying a projection and spring-impelled to move said projection into the path of said lug, a latch for holding said projection out of the path of said lug, and means for tripping said latch, substantially as described.

17. In a phonograph, in combination, a traveling carriage, a shaft carried thereby, a record support secured to said shaft, a lug rotatable with said shaft, a pivoted lever carried by said carriage carrying a projection and spring-impelled to move said projection into the path of said lug, a latch for holding said projection out of the path of said lug, means for tripping said latch and a lever carried by said carriage for operating said tripping means, substantially as described.

18. In a phonograph, in combination, a traveling carriage, a shaft carried thereby, a record support secured to said shaft, a member connected with and rotated by said shaft, a pivoted lever carried by said carriage carrying a projection and spring-impelled to move said projection against said member, a latch for holding said projection out of contact with said member, and means carried by said carriage for tripping said latch, substantially as described.

19. In a phonograph, in combination, a traveling carriage, a movable feed nut carried by said carriage, a stationary frame, a feed screw carried thereby with which said nut is adapted to coöperate, spring means for holding said nut in engagement with said screw, means carried by said carriage and comprising a rotatable cam for forcing said nut out of engagement with said screw, spring means for operating said forcing means, a latch for holding said forcing means in inoperative position, and means for tripping said latch, substantially as described.

20. In a phonograph, in combination, a traveling carriage, a pivoted feed nut carried by said carriage, a stationary frame, a feed screw carried thereby with which said nut is adapted to coöperate, spring means for holding said nut in engagement with said screw, means carried by said carriage for forcing said nut out of engagement with said screw, spring means for operating said forcing means, a latch for holding said forcing means in inoperative position, a lever for tripping said latch and an abutment contacted by said lever during the travel of said carriage to operate the lever, said abutment being adjustable to cause said lever to trip said latch at different points in the travel of said carriage, substantially as described.

21. In a phonograph, in combination, a traveling carriage, a rotatable record support carried thereby, a rock shaft carried by said carriage, a stationary reproducer having a floating weight, and means for raising and lowering said weight independently of the body of said reproducer from the oscillation of said rock shaft at any point in the travel of said carriage, substantially as described.

22. In a phonograph, in combination, a traveling carriage, a rotatable record support carried thereby, a rock shaft carried by said carriage, a stationary reproducer having a floating weight, and a stylus carried thereby, means for raising said weight to place said stylus in inoperative position, means for latching said raising means in inoperative position, and connections from said rock shaft for releasing said raising means from said latching means, substantially as described.

23. In a phonograph, in combination, a traveling carriage, a rotatable record support carried thereby, a rock shaft carried by said carriage, a stationary reproducer having a floating weight, a bell crank and connections therefrom for adjusting the position of said weight, and a connection between said rock shaft and bell crank permitting relative movement between the same longitudinally of said shaft for operating the latter from the former, substantially as described.

24. In a phonograph, in combination, a stationary reproducer having a floating weight, a traveling carriage, a rotatable record support carried thereby, a rock shaft carried by said carriage, a rod secured to said rock shaft and extending longitudinally thereof, a bell crank having a slidable connection with said rod and adapted to be oscillated thereby, and means coacting with said bell crank to raise said floating weight, substantially as described.

25. In a phonograph, in combination, a support, a reproducer secured thereto and carrying a stylus having an operative and inoperative position, and means for determining the position of the stylus comprising a lever pivoted to said support and spring pressed to move said stylus into inoperative position, a link movable to cam said lever into inoperative position, and means for moving said link, substantially as described.

26. In a phonograph, in combination, a support, a reproducer secured thereto and provided with a pivoted floating weight, a bell crank pivoted to said support spring-pressed to raise said weight into inoperative position and having a depending arm with a lug thereon, a link, and means for reciprocating said link to cam said lug against said spring pressure and to release the same, substantially as described.

27. In a phonograph, in combination, a rotatable record support, a reproducer having a floating weight, means comprising a traveling carriage for producing a relative feeding movement between said record support and said reproducer, a rock shaft, means connected thereto for adjusting the position of said weight, braking means carried by said carriage and controlled by said rock shaft for stopping said record support, and a lever movable at will for rocking said shaft in opposite directions, substantially as described.

28. In a phonograph, in combination, a rotatable record support, a reproducer having a floating weight, a rock shaft, a feed screw and a nut movable into and out of engagement with the same, means operated by said rock shaft for positively stopping said record support and moving said nut away from said screw, and means comprising a single member movable at will for rocking said shaft in opposite directions, substantially as described.

29. In a phonograph, in combination, a rotatable record support, a reproducer having a floating weight, a rock shaft, a feed screw and a nut movable into and out of engagement with the same, means operated by said rock shaft for positively stopping said mandrel, moving said nut away from said screw, and lifting said weight, and means comprising a single member movable at will for rocking said shaft in opposite directions, substantially as described.

30. In a phonograph, in combination, a rotatable record support, a shaft therefor, a lug rotating with said shaft, a rock shaft, a lever loosely mounted on said shaft, having a projection thereon, and spring-impelled to move said projection into the path of said lug, a latch for holding said lever with said projection out of the path of said lug, and a lever secured to said rock shaft having a projection thereon adapted to trip said latch, substantially as described.

31. In a phonograph, in combination, a rotatable record support, a shaft therefor, a lug rotating with said shaft, a lever carrying a projection and spring impelled to move said projection into the path of said lug, a latch for holding said lever with said projection out of the path of said lug, and a lever adapted on movement in one direction to trip said latch, and on movement in the opposite direction, to force said first named lever into latched position, substantially as described.

32. In a phonograph, in combination, a traveling carriage, a rotatable record support, and means carried by said carriage for stopping the rotation of said record support, comprising a pivoted lever carrying a brake lug, spring means impelling said lever to braking position, a spring pressed lever one arm of which is adapted to engage said first lever to latch the same in inoperative position, and means for rocking said second lever to trip said latch, substantially as described.

33. In a phonograph, in combination, a traveling carriage, a rotatable record support, and means carried by said carriage for stopping the rotation of said record support, comprising a pivoted lever carrying a brake lug, spring means impelling said lever to braking position, and a spring pressed lever one arm of which is adapted to engage said first lever to latch the same in inoperative position, and the other arm of which extends beyond said carriage, substantially as described.

34. In a phonograph, in combination, a traveling carriage, feeding means for the same comprising a feed screw and a pivoted feed nut, a rock shaft carried by said carriage and operable to disengage said feed nut from said feed screw to render said feeding means inoperative, means comprising a spring to so operate the rock shaft, and means for latching said last named means against operation, substantially as described.

35. In a phonograph, in combination, a traveling carriage, feeding means for the same comprising a feed screw and a pivoted feed nut, a rock shaft carried by said carriage and operable to disengage said feed nut from said feed screw to render said feeding means inoperative, means comprising a spring to so operate the rock shaft, means for latching said last named means against operation, and means for automatically tripping said latching means when the carriage reaches a predetermined point, substantially as described.

36. In a phonograph, in combination, a traveling carriage, feeding means for the same comprising a feed screw and a pivoted feed nut, a rock shaft carried by said carriage and operable to render said feeding means inoperative, manually operable means to operate the rock shaft at will, means comprising a spring co-acting with said manually operable means to operate the rock shaft, means for latching said last named means against operation, and means for automatically tripping said latching means when the carriage reaches a predetermined point, substantially as described.

37. In a phonograph, in combination, a traveling carriage, feeding means for the same, a rock shaft carried by said carriage and operable to render said feeding means inoperative, spring-impelled means to so operate the rock shaft, means for latching said spring impelled means against operation, and manual means for moving said spring-impelled means into latched position, substantially as described.

38. In a phonograph, in combination, a traveling carriage, feeding means for the same, a rock shaft carried by said carriage and operable to render said feeding means inoperative, spring-impelled means to so operate the rock shaft, means for latching said spring impelled means against operation, and a hand lever attached to said rock shaft for operating the latter independently of said spring-impelled means, substantially as described.

39. In a phonograph, in combination, a rotatable record support, driving means therefor, a reproducer, means for producing a relative feeding movement between said reproducer and said record support, means for rendering said last named means inoperative, braking means movable with said driving means and frictionally held against movement with respect to the same, means adapted to resist movement of said braking means with respect to said driving means, and means for simultaneously controlling the operation of said third and fifth named means, substantially as described.

40. In a phonograph, in combination, a rotatable record support, driving means therefor, and means for automatically rendering said driving means inoperative at a desired point in the reproduction of a record carried by said support, said second named means comprising a substantially cylindrical brake band movable with, and yieldingly and non-positively connected to said driving means, and stopping means adapted to engage said brake band to stop said driving means, substantially as described.

41. In a phonograph, in combination, a rotatable record support, a sound box, means for producing a relative feeding movement between said sound box and record support, said means comprising coacting members movable into and out of operative engagement with each other, means for rotating said record support, means for holding the same against rotation, means for latching said last named means in inoperative position, a single controlling member, and connections from said controlling member operable thereby at any desired point in the relative feeding movement between said sound box and said record support to render said latching means operative or inoperative and to simultaneously cause said coacting members to be engaged with or disengaged from each other, substantially as described.

42. In a phonograph, in combination, a rotatable record support, a sound box provided with a stylus, means for producing a relative feeding movement between said sound box and record support, said means comprising coacting members movable into and out of engagement with each other, means for rotating said record support, means for holding the same against rotation, means for latching said last named means in inoperative position, a single controlling member, and connections from said controlling member operable thereby at any desired point in the relative feeding movement between said sound box and said record support to render said latching means operative or inoperative and simultaneously therewith to cause said coacting members to be engaged with or disengaged from each other and said stylus to be moved respectively into or out of engagement with the surface of a record carried by said support, substantially as described.

This specification signed and witnessed this 2d day of August 1910.

PETER WEBER.

Witnesses:
DYER SMITH,
H. H. DYKE.

It is hereby certified that in Letters Patent No. 1,220,480, granted March 27, 1917, upon the application of Peter Weber, of Orange, New Jersey, for an improvement in "Phonographs," an error appears in the printed specification requiring correction as follows: Page 8, line 36, claim 29, for the word "mandrel" read *record support;* and that the said Letters Patent should be read with this correction therein that the same may conform to the record of the case in the Patent Office.

Signed and sealed this 20th day of November, A. D., 1917.

[SEAL.]

R. F. WHITEHEAD,

*Acting Commissioner of Patents.*

Cl. 274—17.